United States Patent [19]

Brglez et al.

[11] Patent Number: 5,043,988

[45] Date of Patent: Aug. 27, 1991

[54] METHOD AND APPARATUS FOR HIGH PRECISION WEIGHTED RANDOM PATTERN GENERATION

[75] Inventors: Franc Brglez, Cary; Gershon Kedem, Chapel Hill; Clay S. Gloster, Jr., Raleigh, all of N.C.

[73] Assignees: MCNC, Research Triangle Park, N.C.; Northern Telecom Limited, Montreal, Canada

[21] Appl. No.: 398,772

[22] Filed: Aug. 25, 1989

[51] Int. Cl.$^5$ ............................................. G01R 31/28
[52] U.S. Cl. ..................................... 371/27; 364/717
[58] Field of Search ................. 371/27, 22.3, 25.1; 364/717

[56] References Cited

U.S. PATENT DOCUMENTS

| | | | |
|---|---|---|---|
| 3,633,100 | 1/1972 | Hellwell et al. | 371/25.1 |
| 3,636,443 | 1/1972 | Singh et al. | 371/25.1 |
| 3,719,885 | 3/1973 | Carpenter et al. | 371/27 |
| 4,546,473 | 10/1985 | Eichelberger et al. | 371/20.3 |
| 4,687,988 | 8/1987 | Eichelberger et al. | 371/22.3 |
| 4,688,223 | 8/1987 | Motika et al. | 371/22.3 |
| 4,730,319 | 3/1988 | David et al. | 371/68.3 |
| 4,745,355 | 5/1988 | Eichelberger et al. | 371/22.3 |
| 4,754,215 | 6/1988 | Kawai | 371/22.3 |
| 4,782,288 | 11/1988 | Vento | 324/158 R |
| 4,801,870 | 1/1989 | Eichelberger et al. | 371/22.3 |
| 4,807,229 | 2/1989 | Tada | 371/27 |
| 4,817,093 | 3/1989 | Jacobs et al. | 371/22.3 |

FOREIGN PATENT DOCUMENTS 59-160236 9/1984 Japan .

OTHER PUBLICATIONS

Gloster, Clay S. and Brglez, Franc. "Boundary Scan with Built-In Self-Test", *IEEE Design & Test of Computers*, Feb. 1989, pp. 36-44.

Lisanke et al., "Testability-Driven Random Test-Pattern Generation", *IEEE Transactions on Computer-Aided Design*, Nov. 1987, pp. 1082-1087.

*Primary Examiner*—Charles E. Atkinson
*Attorney, Agent, or Firm*—Bell, Seltzer, Park & Gibson

[57] ABSTRACT

A high precision weighted random pattern generation system generates any desired probability of individual bits within a weighted random bit pattern. The system includes a circular memory having a series of weighting factors stored therein, with each weighting factor representing the desired probability of a bit in the weighted random pattern being binary ONE. The random bits from a random number generator and a weighting factor are combined to form a single weighted random bit. The random bits and weighting factor are combined in a series of interconnected multiplexor gates. Each multiplexor gate has two data inputs, one being a bit from the weighting factor, the other being the output of the preceding multiplexor gate. The random number bit controls the output of the multiplexor. For example, when the control input (random bit) is high, the multiplexor output is the weighting factor bit. When the control input (random bit) is low, the multiplexor output is the output of the preceding multiplexor. The output of the final multiplexor gate in the series is the weighted bit.

31 Claims, 2 Drawing Sheets

METHOD AND APPARATUS FOR HIGH PRECISION WEIGHTED RANDOM PATTERN GENERATION

FIELD OF THE INVENTION

This invention relates to random pattern generation systems and more particularly to a method and apparatus for efficiently generating weighted random patterns having a high degree of precision.

BACKGROUND OF THE INVENTION

Random pattern generators for generating sequences or patterns of numbers are well known. Random pattern generators are commonly used in data processing and digital signal processing applications such as data encryption, data communications and system testing. For example, random pattern generators are commonly used in testing logic circuits. Accurate and complete testing of a logic circuit is necessary to ensure the functional integrity of the circuit. Random pattern generators are often utilized to generate the necessary test patterns and sequences.

It has heretofore been found that many logic circuits are "resistant" to random pattern testing. For these circuits, in order to achieve complete testing, i.e. obtain high fault coverage, an extremely large number of random patterns must be generated. The simple example of a common "AND" gate having ten inputs illustrates the resistance of a logic circuit to random pattern testing. In order to ensure the functional integrity of the ten input "AND" gate, all ten inputs must have a binary value of ONE. In order to guarantee that a test pattern will be generated having all ten bits with a binary value of ONE, $2^{10}$ random patterns must be generated because each bit of a random pattern will have a binary value of ONE half the time and a binary value of ZERO half the time. This is an extremely large number of test patterns for a single gate. As the complexity of the circuit increases, so does the number of necessary test patterns.

Alternatively, one can forego testing with random patterns and utilize algorithmically generated test patterns. For example, a ten input "AND" gate can be tested in as few as eleven test patterns. However, generation of test patterns with an algorithm, given a circuit structure, is often considered a more difficult task than generating randomly generated test patterns in order to attain the same fault coverage.

The art has heretofore solved this problem by "weighting" the patterns produced by a random pattern generator. Weighting is the technique of generating a random pattern which is slanted or biased toward a desired value. In a weighted random pattern, each bit occurs in a random fashion, but the long term distribution of the bits will not approach an equal distribution of ONEs and ZEROs, but rather will approach a predetermined unequal distribution of ONEs and ZEROs. The resulting weighted pattern will test the inaccessible internal circuit elements. In other words, weighting is the process whereby patterns are biased so that a greater number of ZEROs or a greater number of ONEs may be applied to the inputs of a system being tested, resulting in an increased likelihood of detecting errors in the system.

One known weighted random pattern generation apparatus and method is described in a series of patents assigned to IBM Corporation. See U.S. Pat. No. 4,688,223 to Motika et al.; U.S. Pat. No. 4,687,988 to Eichelberger et al.; U.S. Pat. No. 4,745,355 to Eichelberger et al.; and U.S. Pat. No. 4,801,870 to Eichelberger et al., all of which are entitled Weighted Random Pattern Testing Apparatus and Method. These IBM patents employ a technique for determining the functionality of the system to be tested and individually weighting the test patterns placed upon this system in order to bias the components of the individual test patterns in favor of more or less binary ONEs or ZEROs.

The weighted random pattern generator of the IBM patents is comprised of a random pattern generator of the linear feedback shift register configuration, a weighting circuit having a plurality of cascaded "AND" gates, and a multiplexor. The first five bits of the shift register are the only random bits used and are connected to the cascaded "AND" gates. The first bit is connected directly to the multiplexor as well as one input of the first "AND" gate. Each successive random bit of the five are input to a successive one of the "AND" gates. The second input to the second, third and fourth "AND" gates are the outputs of the preceding gate. In addition to being inputs for successive "AND" gates of the weighting circuit, these outputs are also inputs to the multiplexor. The series of gates causes the probability of producing a binary ONE at each successive output to be one half that of producing a binary ONE at the preceding output. Thus the probabilities are one-half, one-fourth, one-eighth, one sixteenth, and one-thirty-second.

The multiplexor acts as a weight selector. The two control inputs to the multiplexor, i.e. a selector and a gating clock respectively, select the weight (input) to be used and provide the timing to gate the selected weight (input) through the multiplexor. The gating through of the weights occurs every first, second, third, fourth, or fifth shift (clock cycle) depending on whether the original bit comes from the first, second, third, fourth, or fifth bit location of the linear feedback shift register. Finally, the weight selected can be controlled so as to determine whether binary ZEROs or ONEs are to have the greater weight.

A major problem with the IBM weighting circuit is that all possible weights are not obtainable in that the set of possible weights is restricted to $\{\frac{1}{2}^k, \frac{1}{2}^{k-1}, \ldots, \frac{1}{2}, \ldots, 1\frac{1}{2}^{k-1}, 1\frac{1}{2}^k\}$, $k = 1, 2, 3 \ldots, \infty$. In other words, regardless of the value for k, this means that weights in the ranges of $(\frac{1}{2}, \frac{1}{4})$, $(\frac{1}{4}, \frac{3}{4})$, $(\frac{1}{4}, 1/16)$, $\{\frac{3}{4}, 15/16\}$ and so forth can never be achieved. Furthermore, obtaining a low probability (one very close to zero) or a high probability (one very close to one) is very time consuming since k clock cycles are required to obtain a signal, i.e. output, with probability of $\frac{1}{2}^k$ or $1\frac{1}{2}^k$. Finally, each input to a circuit to be tested requires one weighted pattern generator. This results in a great deal of hardware overhead. Although increased precision could be obtained using this system, the hardware complexity would continue to increase.

U.S. Pat. No. 3,719,885 to Carpenter et al. entitled "Statistical Logic Test System Having A Weighted Random Test Pattern Generator" also describes a weighted random pattern generation system having a decoder which converts random patterns from binary to decimal producing a large number of weight variations in order to achieve a high fault coverage. This results in the number of test patterns being proportional to the circuit switching activity, i.e. the complexities of the hidden circuit logic.

The Carpenter et al. weight pattern generator consists of a random pattern generator, a bit decoder and a weighting circuit. The bit decoder operates as a binary to decimal decoder producing a large number of outputs. The weighting circuit provides a larger number of bits to those elements of circuit under test which require a greater number of test patterns to insure the functional integrity of that particular element. In essence, the weighting performed in Carpenter et al. simply provides a means for supplying certain circuit element inputs with a larger number of test bits than other inputs. The weighting combines outputs of the decoder based on the resistance a given element, i.e. circuit input, has to random pattern testing.

In order to ensure the functional integrity of a highly complex circuit using the Carpenter et al. system, it is necessary to generate an extremely large number of test patterns. Moreover, testing time will increase with the complexity of the circuit. Finally, it is not possible to modify the test patterns so as to achieve a certain probability of producing a given test pattern, to thereby decrease the number of test patterns necessary to insure the functionality of the circuit under test.

A system for obtaining test patterns having certain probabilities is also described by David et al. in U.S. Pat. No. 4,730,319 entitled "Device For Transforming The Occurrence Probability Of Logic Vectors And For The Generation Of Vector Sequences With Time Variable Probabilities." David et al. provides a scheme whereby the probability that a given test pattern must occur is determined. Each pattern is then loaded into memory a number of times proportional to the total number of memory locations based upon the probability the test pattern must occur. A random number generator, which inherently has an equal chance of producing any given result, generates the address of the memory location where the test pattern is stored. The probability of obtaining a given test pattern is dependent upon the number of times that the pattern has been loaded into memory. The probability of selecting a particular memory location is not affected.

Although David et al. permits probabilities to be allocated, this allocation is based upon a manual load of patterns into memory based upon desired probability of occurrence. The probability of selecting one test pattern over another is constant in that the probability of selecting each memory location is equal. The selecting technique does not permit any modification of the random pattern. Moreover, the David et al. testing scheme is inefficient because the test vectors are not generated by modifying a random pattern but rather are manually determined and then forced into selection using the probability. Due to the high labor intensity needed to accomplish this task, testing of complex circuits will be very time consuming.

In summary, while the prior art provides weighted random pattern generators for producing weighted test patterns or vectors, these weighted random pattern generators may require a large number of test vectors in order to obtain high fault coverage. The precision of prior art weighted random number generators is limited, so that any arbitrary probability cannot be readily generated. Prior art weighted random number generators employ complex hardware which, by definition, limits the speed of weighted random number generation. Modification of the random patterns is also difficult.

SUMMARY OF THE INVENTION

It is therefore an object of the invention to provide a method and apparatus for generating high precision weighted random patterns, having the desired probability given to any desired precision, so that elements of circuits which are resistant to random pattern testing can be accurately targeted, utilizing a minimal number of test patterns or vectors.

It is another object of the invention to provide a weighted random pattern generator composed of simple hardware which obtains high fault coverage during testing with a minimal number of test patterns.

It is yet another object of the invention to provide a weighted random pattern generator which produces weighted random patterns at high speeds, to test complex circuits quickly and efficiently.

These and other objects of the present invention are provided by an apparatus for generating weighted random patterns including a circular or recirculating memory which contains a plurality of multibit weighting factors. A random pattern generator, for example in the form of a known linear feedback shift register or a cellular automata register, generates random patterns of multiple bits. A circuit is provided for combining the multibit weighting factors stored in the memory with a random pattern generated by the random pattern generator to obtain a weighted random test pattern.

More particularly, according to the invention, each multibit weighting factor represents the probability that a single bit of the weighted random pattern will have a binary value of ONE. As the need for precision of this probability increases, the number of bits in the multibit weighting factor also increases. Thus any desired precision may be obtained. To generate a single bit of the weighted random pattern, the multibit weighting factor for that bit is combined, on a bit by bit basis, with bits from a random number generator, using the combining circuit of the present invention. This combining takes place in a single clock cycle. To generate the next bit of the weighted random pattern, the next multibit weighting factor stored in memory is combined, on a bit by bit basis, with selected bits for the random number generator, using the combining circuit of the present invention. The process continues through all locations of the circular memory and restarts through the memory in a circular fashion.

The combining circuit of the present invention is a plurality of serially connected multiplexor gates. Each gate has two data inputs, i.e. one bit from the multibit weighting factor stored in circular memory and the output bit of the previous gate. The selected bits from the random pattern generator control the multiplexor gates thus determining whether the output of a given multiplexor gate is the weight bit or the output from the preceding multiplexor gate. This combining circuit implements a boolean function of the form $$Z_j = \overline{A}^{r-1}\overline{A}^{r-2} \ldots \overline{A}^0 W_j^r + A^{r-1} W_j^{r-1} + \overline{A}^{r-1} A^{r-2} W_j^{r-2} + \ldots + \overline{A}^{r-1}\overline{A}^{r-2} \ldots A^0 W_j^0;$$

where A is the selected of a subtotal of r the random pattern, W is the selected bit of a weighting factor associated with $Z_j$ having a total of r+1 bits, and $Z_j$ is the weighted random bit which forms one bit of the weighted random pattern.

This boolean function may be implemented using simple multiplexor hardware thus decreasing the generation time and circuit complexity. The boolean function produces one bit of the weighted random number in a single clock cycle. In addition, since any probability is obtainable, with any desired degree of precision, fewer test patterns will need to be generated while simultaneously providing increased fault coverage. Thus, according to the present invention, virtually any probability of generating a given bit of a test pattern having a binary value of ONE can be achieved utilizing simple hardware resulting in a high precision weighted random pattern generator which provides increased fault coverage while generating a decreased number of test patterns.

The present invention sharply contrasts from the heretofore described IBM patents. Since the possible set of all weights in the IBM patents is restricted to $\{\frac{1}{2}^k, \frac{1}{2}^{k-1}, \ldots \frac{1}{2}, \ldots 1\frac{1}{2}^{k-1}, 1\frac{1}{2}^k\}$, $k=1, 2, 3 \ldots, \infty$ it is not possible to attain many of the weights readily achievable with the present invention. For example, the weights $\frac{3}{8}$, $\frac{5}{8}$, 5/16, 11/16, and so on can never be achieved utilizing the circuit disclosed in the IBM patents. In addition, the multiplexors in the present invention are controlled by the bits from the random source rather than by bits from the weight register as in the IBM patents. These distinctive features contribute to both the uniform resolution of weights and the simplification of hardware.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
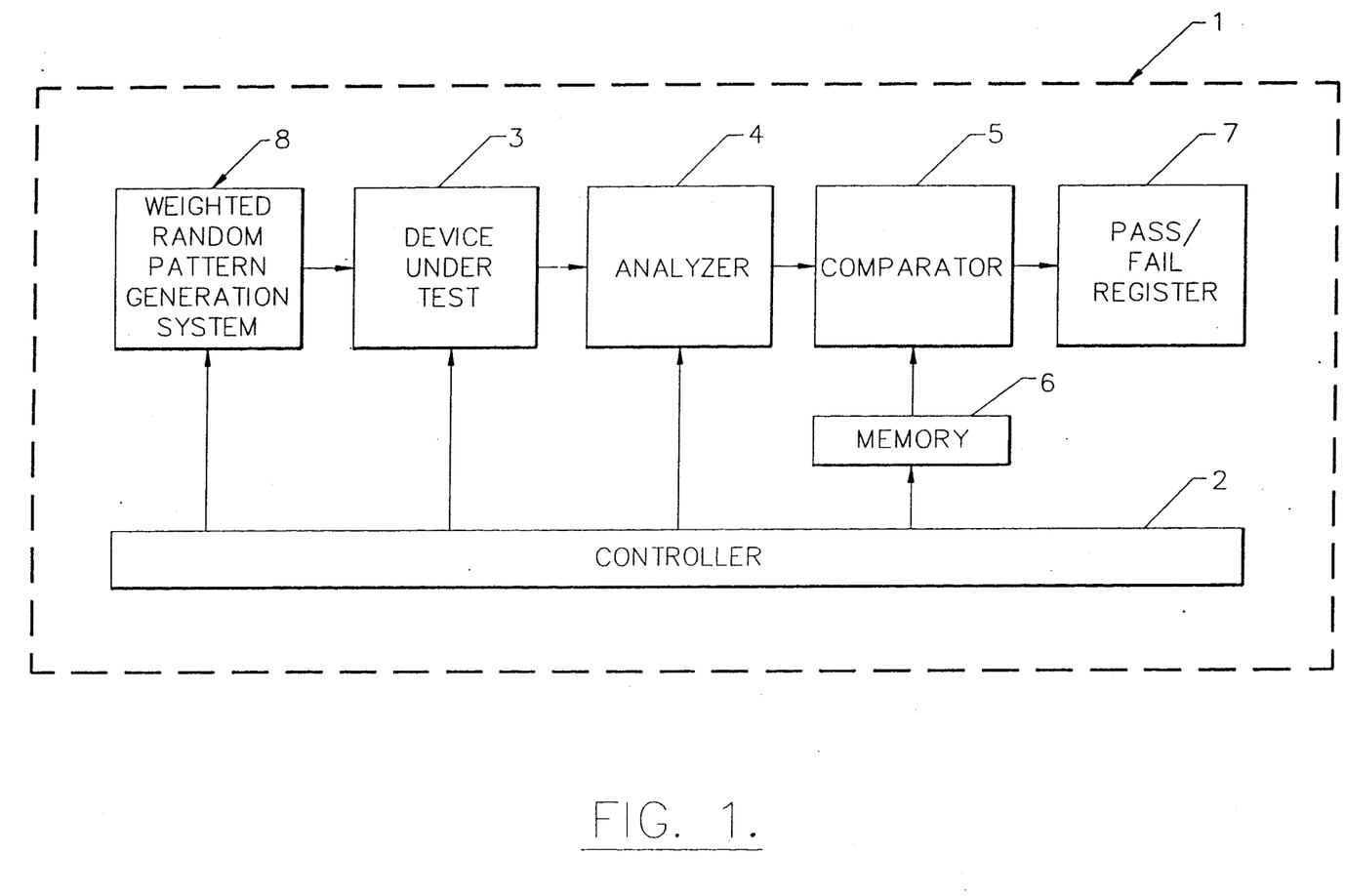
FIG. 1 is a high-level block diagram of a generic testing system including a high precision weighted random pattern generation system according to the present invention.

Referring now to FIG. 1, a high level block diagram of a generic testing system including the high precision weighted random pattern generation system according to the present invention will be described. In one embodiment, a generic testing system 1 contains a controller 2, a device under test 3, an analyzer 4, a comparator 5, a memory 6, a pass/fail register 7, and a weighted random pattern generation system 8. The device under test (DUT) 3 receives test patterns, also known as test vectors, from a weighted random pattern generation system s. The output of DUT 3 resulting from the DUT's operation on the test pattern is transmitted to the analyzer 4. The results of the test is compared by a comparator 5 with a known set of values stored in memory 6. The pass/fail register is set to pass or fail depending on whether the comparator concludes that the DUT passed or failed the test. All operations are controlled by the controller 2. In general, this arrangement, for example, can be built into a single integrated circuit, imbedded in a board-level system as part of a self-test scheme, or made an integral part of a general purpose testing system.

In general, testing of integrated circuits using weighted random pattern generation provides a weighted test pattern which is input into the circuit under test. After processing, the results of the test are analyzed to determine defects or faults in the circuit. Internal elements of a circuit often are resistant to traditional random pattern testing. As the complexity of the circuit under test increases, so does the resistance problem. Weighted random testing has been utilized to address the problem. Weighting, in general, refers to the modification of a randomly generated bit so that the probability of generating a bit having a binary value of ONE or ZERO becomes unequal, i.e. greater than or less than 50%.

Through initial analysis of the structure of the circuit under test, those resistant elements can be found and the test patterns to which those elements are resistant can be determined. In addition, analysis results in a determination of the desired probability of generating a binary value of ONE or ZERO for each bit in a test pattern necessary to target those internal elements which are resistant to random pattern testing. The present invention will generate a given bit of a test pattern within any desired probability. In other words, the weighted random pattern generation system 8 of the present invention can achieve any probability of generating a bit of a test pattern having a binary value of ONE. This results in high precision and ensures complete and accurate testing of a complex circuit while generating a minimal number of test patterns.

Figure 2:
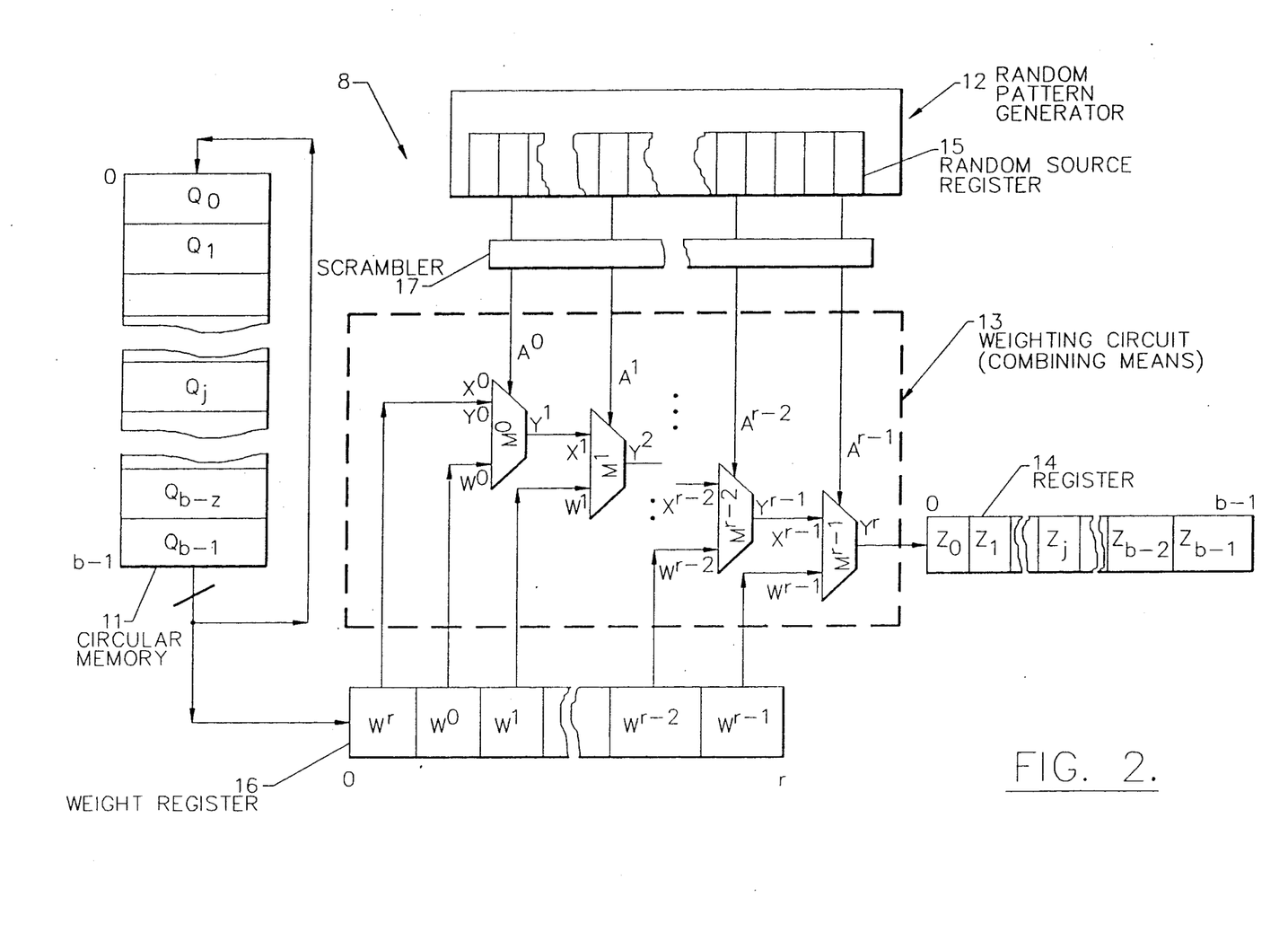
FIG. 2 is a block diagram of a high precision weighted random pattern generation system according to the present invention.

Referring now to FIG. 2, a schematic block diagram of the weighted random pattern generation system of the present invention is shown. The weighted random pattern generation system 8 is comprised of three major components, those being a circular memory 11, a random pattern generator 12 and a combining means 13. Both the circular memory 11 and the random pattern generator 12 are connected to and provide inputs to the combining means 13. A register 14 stores the test bits produced by the combining means.

The weighted random pattern generation system s produces one weighted bit of the weighted test pattern during each clock cycle. Each weighted bit produced is shifted into the weighted random pattern register 14 in which the test bits are accumulated into a test pattern, also referred to as a "test vector". Since, generally speaking, the width of the test pattern, i.e. the number of bits, is unlimited, the size of register 14 varies according to the width of the test pattern.

The circular memory 11 holds a set of weighting factors referred to as $Q_0, Q_1, Q_2, \ldots Q_{b-2}, Q_{b-1}$ where b equals the specified width in a test pattern. Each weighting factor Q has $r+1$ bits. Each multibit weighting factor $Q_j$ which can be referred to as ($W^0, W^1, \ldots W^{r-1}, W^r)_j$ is associated with one respective weighted bit, i.e. $Z_j$, to be generated and stored in register 14.

During a given clock cycle, a weighting factor is selected from memory 11 and transmitted as input into the combining means 13 via weight register 16. At the same time, r of the bits from the pattern generated by the pseudo random pattern generator 12 are selected and input into the combining means via random pattern source register 15. The bits $A^0 \ldots A^{r-1}$ from the random pattern act as control inputs to a cascading series of r two-input multiplexors $M^0 \ldots M^{r-1}$. The bits from one of the weighting factors $(^0, \ldots W^{r-1}, W^r)_j$ selected from memory are the data inputs to multiplexors $M^0 \ldots M^{r-1}$. Thus, in contrast with prior art approaches, the weighting factor is combined to form the pattern rather than act as a controller or selector of bits generated from a random source which results in the weighted random pattern.

The memory 11 is circular or recirculating in nature. The number of words stored in the memory is equal to the number of bits, b, in the resulting test pattern, i.e. the width of the test pattern. Each word in memory is a multibit weighting factor having a number of bits equal to 1 plus the desired precision r, i.e. r+1, which is used to generate a given bit in the weighted test pattern. In other words, each weighting factor $Q_j$, i.e. $(W^0, W^1, \ldots W^{r-1}, W^r)_j$, stored in memory is associated with a particular weighted test bit $Z_j$ of the resulting weighted test pattern. The number of bits in the weighting factor is determined by how accurately one would like to weight the bits in the test pattern, i.e. the desired precision r.

Since one weighted test bit of the weighted test pattern is generated during each clock cycle of the weighted random pattern generation system, the weighted generator must process for a number of cycles equivalent to the number of bits b in the resulting weighted test pattern. Thus, since one weighting factor is used during one clock cycle to produce one weighted test bit, a number of weighting factors equal to the number of clock cycles needed to generate the weighted test pattern, and in turn equal to the number of bits in the weighted test pattern, must be selected. Once a weighting factor $Q_j$ is selected from memory, it is circulated in such a way that it will not be used again until all bits Z for that particular test pattern have been generated.

In other words, each weighting factor $Q_j$ is only used once during the generation of a given weighted test pattern. Thus, the circular memory 11 is a memory having "first in first out" capabilities where the value stored in memory once used is then placed at the farthest address in memory and starts to recirculate through memory as each cycle occurs. At the bit level, since the weighted pattern register 14 is a shift register, the least significant bit $Z_{b-1}$ of the weighted pattern is generated first. Therefore, the weighting factors in memory 11 are stored in a manner consistent with processing such that the weighting factor $Q_{b-1}$ associated with the least significant bit $Z_{b-1}$ of the weighted pattern register 14 is located in memory 11 at the address to be accessed first, i.e. address b-1, and the weighting factor $Q_0$ associated with the most significant bit $Z_0$ of the weighted pattern register 14 is located at address 0, the last address for the first clock cycle.

The design of random pattern generator 12 is known to persons skilled in the art and may be in the configuration of a linear feedback shift register or a cellular automata register. Gloster, Clay S. and Brglez, Franc, *Boundary Scan with Built-In Self-Test*, IEEE Design & Test of Computers, February 1989, pp. 36–44. A register 15, often referred to as a random pattern source register, is contained within the random pattern generator. The random pattern is stored in the register 15 prior to processing. The size of the register 15 is s, and must be equal to or greater than r, the desired precision, in order to reduce adjacent bit correlation. A number of bits r, where r is the desired precision for the bit to be generated, Z, are selected from the source register during processing as control inputs to the combining means 13. The bit locations within the source register 15 from which the bits are selected can be arbitrary in principle. However, for best results, the bits should be truly independent. This is achieved in most cases by maximizing the spacing between the selected r bits.

Once a clock cycle is complete resulting in the generated weighted random bit $Z_j$ being shifted into weighted random pattern register 14, a new clock cycle then starts, resulting in tapping r bits from the random source register 15 and in selecting the next weighting factor of length r or r+1. Which as a result of circulation in memory 11 is located at address zero. The weighting factor $Q_{j+1}$ is then stored in the weight register 16 and inputs to the combining means from the random source register 15 and the weight register 16 are then processed to generate the next significant bit $Z_{j+1}$ of the weighted pattern register. This process continues until a number of weighted bits equal to the length, b, of the weighted test pattern have been generated. Once the weighted test pattern has been generated, a new test pattern can be produced. The same weighting factors are used for each test pattern produced for a particular circuit under test. However, bits from the pattern source register are pseudo-random and hence different in general for each test pattern produced for a given circuit under test as well as for each weighted bit with a weighted test pattern.

Since the random bits generated by a linear feedback shift register or a cellular automata register may not always have values independent of one another, the values of the bits selected may be "scrambled" in order to enhance the independence of the values within the selected bit locations. The scrambling means 17 may take a variety of permutations in conjunction with a series of parallel EXCLUSIVE-OR gates.

The combining means 13 is comprised of a set of cascading multiplexor gates $M^0 \ldots M^{r-1}$ each having three inputs $X^0 \ldots X^{r-1}, W^0 \ldots W^{r-1}, A^0 \ldots A^{r-1}$ and one output $Y^1 \ldots Y^r$. The output $Y^i$ from one gate is connected to one of the three inputs $X^i$ of the immediately succeeding multiplexor gate. The other two inputs $W^i$ and $A^i$ respectively are bits from the weighting factor stored in the weight register 16 and from the random source register 15. The weight bit $W^i$ from the weight register and $X^i$ tied to the output $Y^i$ from the immediately preceding multiplexor gate $M^{i-1}$, are the two data inputs to the multiplexor gate $M^i$. The bit from the random source register $A^i$ acts as a control bit for the multiplexor gate $M^i$. In other words, the output $Y^{i+1}$ of multiplexor $M^i$ will be either the value of input $X^i$ or input $W^i$ depending upon whether control input $A^i$ is binary ZERO or ONE. The one exception to this general structure is the first multiplexor gate $M^0$ in the cascading series in which the two data inputs $X^0$ and $W^0$ are the two bits $W^r$ and $W^0$ of the weighting factor $Q_j$, i.e. $(W^0, \ldots W^{r-1}, W^r)_j$ stored in the weight register 16 and the control bit $A^0$ is the bit from the random source register 15.

The weighting function performed by the combining means 13 for generating $Z_j$ generally, will now be illustrated using actual binary values where precision r=1, 2, 3. The precision r is the desired precision for the test pattern. For illustration purposes, assume that the weighting factor $Q_j$, associated with the weighted test bit $Z_j$, has been loaded into weight register 16.

The simplest case is a precision of 1, i.e. r=1, or a 1 bit resolution. The combining means 13 consists of only a single multiplexor, $M^0$, for r=1. In $M^0$, for r=1, $A^0$, the control input, selects between two data inputs, $X^0$ and $W^0$, producing the output $Y^1$. For $M^0$, $X^0$ is tied to $W^r$ and since r=1, $X^0 = W^1$. During any observation sequence, $A^0$ will be binary ZERO half the time and binary ONE the other half of the time, since $A^0$ is driven by a register cell from an unbiased pseudo random source 12. Correspondingly, the output $Y^1$ will be $X^1 = W^1$ half of the time and $W^0$ the other half of the time. In other words, the probability that $Y^1$ attains the value of 1 can be represented by the following equation:

$$Prob[Y^1=1] = \tfrac{1}{2}*X^0 + \tfrac{1}{2}*W^0 \qquad (1)$$

For r=1 and thus $X^0 = W^0$, a total of four sets of data input assignments to multiplexor $M^0$ can be made taken from the set of binary weight $\{(W^1, W^0):(1,1)\ (0,0)\ (0,1)$ and $(1,0)\}$ resulting in the set of signal probabilities $\{0,\tfrac{1}{2},1\}$ at the multiplexor output $Y^1$.

When it is desired that the output $Y^1$ be guaranteed to be binary ONE, and thus $Prob[Y^1=1]=1$, then the weighting factor chosen must be $Q=(W^0W^1)=(11)$ and the weights $(W^1,W^0)$ equal $(1,1)$. Thus, the output $Y^1$ will always be 1. On the other hand, if it is desired that the output $Y^1$ never be 1, i.e. $Prob[Y^1=1]=0$, then the weighting factor chosen must be $Q=(W^0W^1)=(00)$ and the weights $(W^1,W^0)$ equal $(0,0)$ to insure an output of $Y^1=0$. Where a probability of $\tfrac{1}{2}$ of obtaining an output $Y^1=1$ is desired, i.e. $Prob[Y^1=1]=\tfrac{1}{2}$, the weighting factor chosen is $Q=(W^0W^1)=(10)$ and the weights $(W^1,W^0)$ are equal $(0,1)$. Thus, $Y^1$ attains a binary value of ONE half the time and a binary value of ZERO half the time.

The weighting factor $Q=(W^0W^1)=(01)$ resulting in data inputs $(W^1,W^0)=(1,0)$ is not utilized. The reason is that $W^r$ (in this case $W^1$) is only used when a guaranteed output $Y^1=1$ is desired, i.e. $Prob[Y^1=1]=1$. When the probability $Prob[Y^1=1]<1$, $W^r$ weight bit has no effect on $Y^1$ and therefore is simply not considered for purposes of illustration. This is true regardless of the desired precision. In addition, if the situation warrants that $Prob[Y=1]$ will never be 1, i.e. always less than 1, then an alternative embodiment for the combining means 13 can be used wherein input $X^0$ to multiplexor $M^0$ is tied to binary ZERO rather than $W^r$.

The second case to illustrate and which follows in sequence is that for a precision of r=2. A precision of 2 requires use of two multiplexors, $M^0$ and $M^1$, in the combining means 13. The combining means now has two control inputs $A^0$ and $A^1$ respectively for multiplexors $M^0$ and $M^1$. The four data inputs and two data outputs are $(X^0,W^0)$, $(X^1,W^1)$ and $Y^1, Y^2$ respectively for multiplexors $M^0$ and $M^1$ where $X^0=W^r=W^2$ since r=2 and $X^1=Y^1$. During any observation sequence, $A^1$ will be ZERO half the time and ONE the other half of the time since $A^1$ is driven by a register cell from an unbiased pseudo random source 12. As a result, $A^1$ will select $X^1$ as output $Y^2$ one half of the time and the input $W^1$ as output $Y^2$ the other half of the time. Remembering that Equation 1 represents the probability of attaining the value 1 for output $Y^1$, the probability of attaining the value 1 for $Y^2$ can be represented as follows:

$$Prob[Y^2=1] = \tfrac{1}{2}*Prob[Y^1=1] + \tfrac{1}{2}*W^1 \qquad (2)$$

Equation (1) for the case or r=1, $Prob[Y^1=1] = \tfrac{1}{2}*X^0 + \tfrac{1}{2}*W^0$, can be substituted into Equation (2) resulting in the expanded equation which represents $Prob[Y^2=1]$ where r=2:

$$Prob[Y^2=1] = \tfrac{1}{2}*(\tfrac{1}{2}*X^0\tfrac{1}{2}*W^1 \qquad (3)$$

For r=2 and thus $X^0 = W^r = W^2$, a total of eight sets of data input assignments can be made from the set of weighting bits $\{W^2,W^0,W^1\}$ stored in weight register 16. These data input assignments are represented as follows in Table 1:

TABLE 1

| $W^2$ | $W^1$ | $W^0$ | $Prob[Y^2 = 1]$ |
|---|---|---|---|
| 0 | 0 | 0 | 0 |
| 0 | 0 | 1 | $\tfrac{1}{4}$ |
| 0 | 1 | 0 | 2/4 |
| 0 | 1 | 1 | $\tfrac{3}{4}$ |
| 1 | 1 | 1 | 1 |
| 1 | x | x | not used with $W^2 = 1$, except for the single entry above |

It is important to remember that where r=2, the weighting bits $W^2$ and $W^0$ are inputs to multiplexor $M^0$ and weighting bit $W^1$ is an input to multiplexor $M^1$. The set of signal probabilities $\{0,\tfrac{1}{4},2/4,\tfrac{3}{4},1\}$ can be generated by the output $Y^2$ of the second multiplexor $M^2$ using the weighting bits from Table 1.

As in the case where r=1, where a guaranteed output of $Y^2=1$ for multiplexor $M^1$ is desired, $Prob[Y^2=1]=1$. The weighting factor chosen must be $Q=(W^0W^1W^2)=(111)$ resulting in the weighting bits $(W^2,W^0,W^1)$ being $(1,1,1)$ as in line 5 of Table 1. On the other hand, when a guaranteed output of $Y^2 \neq 1$ is desired, i.e. $Prob[Y^2=1]=0$ the weighting factor must be $Q=(W^0W^1W^2)=(000)$ resulting in weighting bits $(W^2,W^0,W^1)=(0,0,0)$ as in line 1 of Table 1. The remaining probabilities for obtaining $Y^2=1$, i.e. $0<Prob[Y^2=1]<1$ are spaced uniformly, in increments of $\tfrac{1}{4}$, evaluated from $2^{-r}$ for r=2.

The present invention permits uniformly decreasing the spacing between obtainable output probabilities by simply increasing the number of multiplexors and the corresponding data and control inputs, i.e. increasing the precision r. This is demonstrated in the next case where the precision is r=3. For this case, the combining means 13 is comprised of a cascading series of three multiplexors $M^0, M^1$ and $M^2$. The control inputs selected from random source register 15 are $A^0, A^1$ and $A^2$ for multiplexors $M^0, M^1$ and $M^2$. The data inputs to the cascading series for $M^0$ are $(X^0,W^0)$ where $X^0=W^3$ resulting in output $Y^1$. The data inputs to multiplexor $M^1$ are $(X^1,W^1)$ where $X^1=Y^1$, resulting in output $Y^3$. The data inputs to multiplexor $M^2$ are $(X^2,W^2)$ where $X^2=Y^2$, resulting in the output $Y^3$. The output $Y^3$ for the case r=3 is the will be binary ZERO one half the time and binary ONE the other half of the time since $A^2$ is driven by a register cell from an unbiased pseudo random source 12. As a result, $A^2$ will select the input $X^2$ as output $Y^3$ one half of the time and the input $W^2$ as output $Y^3$ the other half of the time.

As was the case for the probabilities of attaining the value of 1 for outputs $Y^1$ and $Y^2$, the probability of attaining the value of 1 for output $Y^3$ can be represented by the following equation:

$$Prob[Y^3=1] = \tfrac{1}{2}*Prob[Y^2=1] + \tfrac{1}{2}*W^2 \qquad (4)$$

When Equation (2), $\text{Prob}[Y^2=1]=\frac{1}{2}*\text{Prob}[Y^1=1]+\frac{1}{2}*W^1$, is substituted into Equation (4), the intermediate expanded equation is as follows:

$$\text{Prob}[Y^3=1]=\frac{1}{2}*(\frac{1}{2}*\text{Prob}[Y^1=1]+\frac{1}{2}*W^1)+\frac{1}{2}*W^2 \quad (5)$$

When Equation (1), $\text{Prob}[Y1=1]=\frac{1}{2}*X^0\frac{1}{2}W^0$ is substituted into Equation (5), the final expanded form for the probability of attaining a value of 1 for output $Y^3$ is:

$$\text{Prob}[Y^3=1]=\frac{1}{2}*(\frac{1}{2}*(\frac{1}{2}*X^0+\frac{1}{2}*W^0)+\frac{1}{2}*W^1)+\frac{1}{2}*W^2 \quad (6)$$

For the case having precision $r=3$ and thus $X^0=W^r=W^3$, a total of sixteen sets of data input assignments can be made from the set of weighting bits $(W^3,W^0,W^1,W^2)$ stored in weight register 16. These data input assignments are represented as follows:

TABLE 2

| $W^3$ | $W^2$ | $W^1$ | $W^0$ | $\text{Prob}[Y^3 = 1]$ |
|---|---|---|---|---|
| 0 | 0 | 0 | 0 | 0 |
| 0 | 0 | 0 | 1 | 1/8 |
| 0 | 0 | 1 | 0 | 2/8 |
| 0 | 0 | 1 | 1 | 3/8 |
| 0 | 1 | 0 | 0 | 4/8 |
| 0 | 1 | 0 | 1 | 5/8 |
| 0 | 1 | 1 | 0 | 6/8 |
| 0 | 1 | 1 | 1 | 7/8 |
| 1 | 1 | 1 | 1 | 1 |
| 1 | x | x | x | not used with $W^3 = 1$, except for the single entry above. |

It is important to remember that where $r=3$, the weighting bits $W^3$ and $W^0$ are inputs to multiplexor $M^0$, weighting bits $W^1$ is an input to multiplexor $M^1$ and weighting bit $W^2$ is an input to multiplexor $M^2$. The set of signal probabilities $\{0,\frac{1}{8},2/8,\frac{3}{8},4/8,\frac{5}{8},6/8,\frac{7}{8},1\}$ can be generated as output $Y^3$ of the third multiplexor $M^3$ using the weighting bits from Table 2.

As in the cases for $r=1$ and $r=2$, where a guaranteed output of $Y^3=1$ for multiplexor $M^2$ is desired, i.e. output $Y^3$ is always 1, the probability of attaining a binary ONE is 1 and represented as $\text{Prob}[Y^3=1]=1$. In order to insure an output of binary ONE, the weighting factor chosen must be $Q=(W^0W^1W^2W^3)=(1111)$ resulting in the weighting bits $(W^3,W^0,W^1,W^2)$ being $(1,1,1,1)$ as in line 9 of Table 2. On the other hand, where a guaranteed output of $Y^3 \neq 1$ is desired, i.e. output $Y^3$ is never 1, the probability of attaining a binary ONE is 0 and represented as $\text{Prob}[Y^3=1]=0$. In order to obtain an output consistent with this probability, the weighting factor necessary to achieve $\text{Prob}[Y^3=1]0$ is $Q=(W^0W^1W^2W^3)=(0000)$ resulting in weighting bits $(W^3,W^0,W^1,W^2)=(0,0,0,0)$ as in line 1 of Table 2. The remaining probabilities of attaining an output $Y^3=1$, i.e. $0<\text{Prob}[Y^3=1]<1$ are spaced uniformly in increments of $\frac{1}{8}$, evaluated for $2^{-r}$ for $r=3$.

According to the present invention, the spacing between obtainable probabilities can be uniformly decreased by increasing the number of multiplexors and the corresponding input signals, i.e. increasing the precision r. The order of the weighting bits represented as $W^0, W^1, \ldots W^{r-1}, W^r$ correspond with ordinary binary encoding for signals in that $W^0$ represents the least significant bit and $W^r$ represents the most significant bit. This encoding simplifies the assignment of output signal probabilities, i.e. $\text{Prob}[Y^1=1]$ where $i=1,2,\ldots r$ for multiplexor outputs $Y^1, \ldots, Y^{r-1}, Y^r$. In other words, a weighting factor $Q_j=(W^0W^1W^2W^3)_j$ for $r=3$ has a binary value of (0001) resulting in an assignment of a signal probability of Q (numerical equivalent) $* 2^{-r}=\frac{1}{8}$.

Similarly, the weighting factor $Q=(0011)$ assigns a signal probability of $\frac{3}{8}$ to the multiplexor output. Thus, any signal probability for a multiplexor output is obtainable and is represented by:

$$\text{Prob}[Y^1=1,2,\ldots r]=Q(\text{numerical equivalent})*2^{-r} \quad (7)$$

Signal probabilities, such as $\frac{3}{8}$ and $\frac{5}{8}$, achievable by the present invention, can never be attained using the apparatus and methods disclosed in the IBM patents. As the value of the precision r, is increased, more signal probabilities which are not attainable using the disclosures of the IBM patents can be achieved through the present invention. In general, the choice for precision r will depend upon the properties of the DUT 3. As the value of r increases, the number of weighted random patterns required to test the circuit will generally decrease.

In the general case, the combining means 13, is comprised of r cascading multiplexor gates $M^0 \ldots M^{r-1}$, wherein r is the desired resolution. The combining means 13 combines r bits $A^0 \ldots A^{r-1}$ from random pattern source register 15 and $r+1$ weighting bits $W^0 \ldots W^r$ from memory 11 via the weight register 16. The combining means can be represented by the boolean function:

$$Y^0=X^0=W^r; \quad (8A)$$

$$Y^i=\overline{A}^{i-1}Y^{i-1}+A^{i-1}W^{i-1}, i=1\ldots r. \quad (8B)$$

In Equation (8A), $Y^0$ is equivalent $X^0$. The boolean representation of the combining means 13 can be further expanded to:

$$Z_j = \overline{A}^{r-1}\overline{A}^{r-2}\ldots\overline{A}^0W^r + A^{r-1}W^{r-1} + \quad (9)$$
$$\overline{A}^{r-1}A^{r-2}W^{r-2} + \ldots + \overline{A}^{r-1}\overline{A}^{r-2}\ldots A^0W^0.$$

Since r is the desired precision, the variables of these two boolean representations (8) and (9) relate to the hardware design in that $A^0 \ldots A^{r-1}$ represents the r bits from the random pattern source 15; $W^r$ represents the $r^{th}$ bit of the weighting factor Q which is connected to input $X^0$ of the multiplexor gate of $M^0$; $W^0 \ldots W^{r-1}$ represent the remaining r bits of the weighting factor which are connected to inputs $W^0 \ldots W^{r-1}$ of the multiplexor gates M; $Y^1$ represents the output from multiplexor gate $M^0$; and $Y^2 \ldots Y^r$ represent the remaining outputs for the remaining multiplexor gates $M^1 \ldots M^{r-1}$; and $Z_j$ represents the output $Y^r$ of multiplexor $M^{r-1}$. The output of the final multiplexor gate $M^{r-1}$ is the weighted random bit $Y^r$, and is shifted as a bit $Z_j$ into the jth position of the weighted random pattern register 14.

The conditions under which the combining means 13 will generate weighted random patterns with a specified probability can also be represented to the rth iteration by a mathematical formula. For simplicity, set $y^i=\text{P}[Y^i=1]$, i.e. $y^i$ is the probability that $Y^i$ has a value of 1. If the random bits A selected from the random source register 15 are uniformly distributed, independent, random binary variables, then the $P[A^i=1 \wedge A^j=1]=P[A^i=1]*P[A^j=1]$. In other words, if true bit independence exists, then, the joint probability that random bit $A^i$ has a binary value of 1 and random bit $A^j$ has a binary value of 1 is equal to the probability that random bit $A^i$ has a binary value of 1 multiplied by the probability that random bit $A^j$ has a binary value of 1.

In addition, for simplicity, lower case may also be used to represent the probabilities w and z that weighting bit W has a binary value of ONE; i.e. $w^i = P[W^i = 1]$, and weighted random bit Z has a binary value of ONE, i.e. $z_j = P[Z_j = 1]$.

Thus, the probability equations for each step through r are expressed as:

$$y^0 = w^r$$
$$y^1 = y^0/2 + w^0/2$$
$$y^2 = y^1/2 + w^1/2$$
$$\vdots$$
$$y^r = y^{r-1}/2 + w^{r-1}/2$$
(10)

Upon substitution, this series of r+1 equations can be expressed in the alternative as:

$$z_j = 2^{-r}w^r + \Sigma^r_{i=1} 2^{-i}w^{r-i}$$
(11)

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. A weighted random pattern generation system comprising:
    a memory having a plurality of multibit weighting factors stored therein;
    a random pattern generator for generating a plurality of multibit random bit patterns; and
    means, connected to said memory and said random pattern generator, for combining said multibit weighting factors with said multibit random bit patterns to form a multibit weighted random pattern.

2. A weighted random pattern generation system comprising:
    a memory having a plurality of multibit weighting factors stored therein;
    a random pattern generator for generating a random bit pattern; and
    means, connected to said memory and said random pattern generator, for combining said multibit weighting factors with said random bit pattern to form a weighted random pattern;
    wherein said combining means comprises a plurality of serially connected stages each having a plurality of inputs and an output, the output of an immediately preceding stage being connected to one of said plurality of inputs of an immediately succeeding stage; a respective bit of said multibit weighting factors and a respective bit of said random bit patterns being connected to the inputs of a respective one of said stages.

3. The weighted random pattern generation system of claim 2:
    wherein one of said plurality of inputs of each of said stages comprises a control input; and,
    wherein said respective bit of said random bit pattern is connected to a respective one of said control inputs.

4. A weighted random pattern generation system comprising:
    a memory having a plurality of multibit weighting factors stored therein;
    a random pattern generator for generating a random bit pattern; and
    means, connected to said memory and said random pattern generator, for combining said multibit weighting factors with said random bit pattern to form a weighted random pattern;
    wherein said combining means comprises a plurality of serially connected multiplexor gates, each of said serially connected multiplexor gates having first and second data inputs, a control input and an output, with the binary value of said output being one of the binary value of said first and said second data inputs depending upon the binary value of said control input; the output of an immediately preceding stage being connected to the first data input of an immediately succeeding stage; a respective bit of said multibit weighting factors being connected to a respective one of said second data inputs; and a respective bit of said random bit pattern being connected to a respective one of said control inputs.

5. A weighted random pattern generation system comprising:
    a memory having a plurality of multibit weighting factors stored therein;
    a random pattern generator for generating a random bit pattern; and
    means, connected to said memory and said random pattern generator, for combining said multibit weighting factors with said random bit pattern to form a weighted random pattern;
    wherein said combining means combines said multibit weighting factors and said random bit pattern according to the following boolean function:

$$Y^0 = W^r;$$

$$Y^i = \overline{A}^{i-1} + A^{i-1} W^{r-1}, i = 1 \ldots r;$$

where r is the desired precision, $A^i$ is one bit of said random pattern, $W^i$ is one bit of the selected one of said weighting factors, $Y^i$ is the result of combining $A^i$ and $W^i$ except for $Y^0$ which is set to $W^r$, and $Y^r$ is the result of the final iteration for generating one bit of said weighted random pattern.

6. A weighted random pattern generation system comprising:
    a memory having a plurality of multibit weighting factors stored therein;
    a random pattern generator for generating a random bit pattern; and
    means, connected to said memory and said random pattern generator, for combining said multibit weighting factors with said random bit pattern to form a weighted random pattern;
    wherein said combining means combines said multibit weighting factors and said random bit pattern according to the following boolean function:

$$Z_j = \overline{A}^{r-1}\overline{A}^{r-2} \ldots \overline{A}^0 W^r + A^{r-1} W^{r-1} +$$
$$\overline{A}^{r-1} A^{r-2} W^{r-2} + \ldots + \overline{A}^{r-1} \overline{A}^{r-2} \ldots A^0 W^0;$$

where r is the desired precision, $A^i$ is a bit of said random pattern, $W^i$ is one bit of the selected one of said weighting factors and $Z_j$ is the generated weighted random bit.

7. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- a complex digital logic circuit to be tested, said complex digital logic circuit being operationally connected to said combining means;
- said weighted random pattern generation system being fabricated on a single integrated circuit chip for performing boundary scan testing of said complex digital logic circuit which is operationally connected thereto.

8. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein said random bit pattern controls the combining of said multibit weighting factors in said combining means.

9. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein said combining means combines one of said multibit weighting factors with said random bit pattern in a single clock cycle.

10. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- a register connected to said combining means for storing therein said weighted random pattern formed by said combining means.

11. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein said memory comprises a circular memory.

12. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein said random pattern generator includes a register for storing said random bit pattern therein, said register being connected to said combining means.

13. The weighted random pattern generation system of claim 1 wherein said random pattern generator comprises a linear feedback shift register.

14. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein said random pattern generator comprises a cellular automata register.

15. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein the number of bits in said multibit weighting factors are determined by the desired precision for said weighted random pattern.

16. The weighted random pattern generation system of claim 1 wherein each of said multibit weighting factors comprises a probability that a single bit in said weighted random pattern equals ONE.

17. The weighted random pattern generation system of claim 1 wherein said multibit weighting factors comprises a probability that a single bit in said weighted random pattern equals ZERO.

18. The weighted random pattern generation system of claim 1 wherein bits of said random bit pattern are independent of one another.

19. A weighted random pattern generation system comprising:
- a memory having a plurality of multibit weighting factors stored therein;
- a random pattern generator for generating a random bit pattern; and
- means, connected to said memory and said random pattern generator, for combining said multibit weighting factors with said random bit pattern to form a weighted random pattern;
- wherein bits of said random bit pattern are dependent upon one another, and wherein said weighted random bit pattern generation system further comprises scrambling means, connected between said random bit pattern generator and said combining means, for converting the dependent portions of said random pattern into independent portions.

20. The weighted random pattern generation system of claim 19 wherein said scrambling means is comprised of a plurality of EXCLUSIVE-OR gates.

21. The weighted random pattern generation system of claim 1 in combination with a testing system, said testing system being operationally connected to said random pattern generation system, for testing a device under test, said device under test being operationally connected to said testing system.

22. A weighted random pattern generation method comprising the steps of:
 providing a first multibit weighting factor;
 generating a first multibit random bit pattern;
 combining the first multibit weighting factor and the first multibit random bit pattern to generate a first bit of the weighted random pattern; and
 repeating said providing, generating and combining steps upon second and subsequent multibit weighting factors and second and subsequent random bit patterns to generate second and subsequent bits of the weighted random pattern.

23. The weighted random pattern generation method of claim 22 wherein said combining step comprises the steps of:
 first combining a first bit from the multibit weighting factor and a first bit from the multibit random bit pattern to produce a first output; and
 repeating said first combining step upon second and subsequent bits from the multibit weighting factors, upon second and subsequent bits from the multibit random pattern and upon the first and subsequent outputs to produce second and subsequent outputs.

24. The weighted random pattern generation method of claim 22 wherein said first combining step comprises the step of:
 multiplexing the first bit from the multibit weighting factors and a first data input, under control of the first bit from the multibit random bit pattern to produce a first output;
 and wherein said repeating step comprises the step of:
 multiplexing the second and subsequent bits from the multibit weighting factor and the first and subsequent outputs, under control of the second and subsequent bits from the multibit random bit pattern, to produce second and subsequent outputs.

25. The weighted random pattern generation method of claim 22 wherein said combining step comprises the step of:
 combining said first multibit weighting factor and said first random bit pattern according to the following boolean function;

$$Y^0 = W^r;$$

$$Y^i = A^{i-1} Y^{i-1} + \overline{A}^{i-1} W^{i-1}, i = 1 \ldots r;$$

where r is the desired precision, $A^i$ is one bit of said random pattern, $W^i$ is one bit of the selected one of said weighting factors, $Y^i$ is the result of combining $A^i$ and $W^i$ except for $Y^0$ which is set to $W^r$, and $Y^r$ is the result of the final iteration for generating one bit of said weighted random pattern.

26. The weighted random pattern generation method of claim 22 wherein said combining step comprises the step of:
 combining said first multibit weighting factor and said first random bit pattern according to the following boolean function;

$$Z_j = \overline{A}^{r-1} \overline{A}^{r-2} \ldots \overline{A}^{02} W^r + A^{r-1} W^{r-1} +$$
$$\overline{A}^{r-1} A^{r-2} W^{r-2} + \ldots + \overline{A}^{r-1} \overline{A}^{r-2} \ldots A^0 W^0;$$

where r is the desired precision, $A^i$ is a bit of said random pattern, $W^i$ is one bit of the selected one of said weighting factors and $Z_j$ is the generated weighted random bit.

27. The weighted random pattern generation method of claim 22 wherein the generating step comprises the step of:
 generating a first multibit random bit pattern in which the bits are independent of one another.

28. The weighted random pattern generation method of claim 22 wherein said generating step comprises the steps of:
 generating a first multibit random bit pattern in which the bits are dependent on one another; and
 scrambling the dependent bits to provide a multibit random bit pattern in which the bits are independent of one another.

29. The weighted random pattern generation method of claim 22 wherein the first and subsequent bits for the random bit pattern control the combining of the first and subsequent bits of the multibit weighting factor.

30. The weighted random pattern generation method of claim 22 wherein said combining step is performed in a single clock cycle.

31. A weighted random pattern generation system comprising:
 a random pattern generator for generating a random bit pattern;
 a multibit random pattern source register, connected to said random pattern generator, for storing said random bit pattern;
 a circular memory having a plurality of multibit weighting factors stored therein;
 a multibit weight register, connected to said circular memory, for storing one of said plurality of multibit weighting factors from said circular memory;
 a plurality of serially connected multiplexor gates each having two data inputs, one control input and one data output;
 a respective bit of said multibit random pattern source register being connected to said control input of a respective multiplexor gate;
 a respective bit of said multibit weight register being connected to one of said data inputs of a respective multiplexor gate;
 the data output of an immediately preceding multiplexor gate being connected to the second data input of an immediately succeeding multiplexor gate; and
 a weighted random pattern register for storing a weighted random pattern, the output of the last of said plurality of serially connected multiplexor gates being connected to said weighted random pattern register.

* * * * *

UNITED STATES PATENT AND TRADEMARK OFFICE
CERTIFICATE OF CORRECTION

PATENT NO. : 5,043,988
DATED : August 27, 1991
INVENTOR(S) : Brglez et al.

It is certified that error appears in the above-identified patent and that said Letters Patent is hereby corrected as shown below:

At column 4, line 64, after "selected" please insert --bit--, and after "subtotal of r" please insert --bits of--.

At column 5, line 62, please delete "system 6" and substitute --system 8-- therefore.

At column 6, line 47, please delete "system 6" and substitute --system 8-- therefore.

At column 7, line 4, please delete "($^0$,...$W^{r-1}$, $W^r$)j" and substitute --($W^0$,...$W^{r-1}$, $W^r$)j-- therefore.

At column 8, line 14, delete the period after "1", and delete "Which" and substitute --which-- therefore.

At column 9, line 67, please delete "or" and substitute --of-- therefore.

At column 10, line 4, please delete equation 3 and substitute --Prob[$Y^2$ = 1] = $\frac{1}{2}*(\frac{1}{2}*X^0 + \frac{1}{2}*W^0) + \frac{1}{2}*W^1$-- therefore.

At column 10, line 53, please delete "$Y^3$" and substitute --$Y^2$-- therefore.

At column 10, line 56, after "is the" please insert --weighted test bit $Z_j$. During any observation sequence, $A^2$--.

At column 11, line 7, delete "=$\frac{1}{2}*X^0\frac{1}{2}W^0$" and substitute --=$\frac{1}{2}*X^0+\frac{1}{2}*W^0$-- therefore.

UNITED STATES PATENT AND TRADEMARK OFFICE
CERTIFICATE OF CORRECTION

PATENT NO. : 5,043,988
DATED : August 27, 1991
INVENTOR(S) : Brglez et al.

It is certified that error appears in the above-identified patent and that said Letters Patent is hereby corrected as shown below:

At column 11, line 64, please delete "$[Y^1=1]$" and substitute --$[Y^i=1]$-- therefore.

At column 12, equation 7, delete equation 7 and substitute --$Prob[Y^i=1, i=1,2,...r] = Q(\text{numerical equivalent}) * 2^{-r}$-- therefore.

At column 14, line 38, please delete "$Y^i=\bar{A}^{i-1}+A^{i-1}Wi-1, i=1...r$" and substitute -- $Y^i = \bar{A}^{i-1}Y^{i-1} + A^{i-1}W^{i-1}, i=1...r;$ --

At column 15, line 6, please delete "and".

At column 15, line 10, after "pattern;" please insert --and--.

At column 15, line 50, delete "and".

At column 15, line 54, after "pattern;" insert --and--.

Signed and Sealed this

Sixth Day of July, 1993

Attest:

MICHAEL K. KIRK

*Attesting Officer*   *Acting Commissioner of Patents and Trademarks*